(12) United States Patent
Van Deursen (10) Patent No.: US 8,328,398 B2
(45) Date of Patent: Dec. 11, 2012

(54) MULTI-LEG ROTATABLE HEAD FLASHLIGHT

(76) Inventor: Gary Van Deursen, Essex, CT (US)

(*) Notice: Subject to any disclaimer, the term of this patent is extended or adjusted under 35 U.S.C. 154(b) by 453 days.

(21) Appl. No.: 12/685,833

(22) Filed: Jan. 12, 2010

(65) Prior Publication Data

US 2010/0182777 A1 Jul. 22, 2010

Related U.S. Application Data

(60) Provisional application No. 61/205,507, filed on Jan. 20, 2009.

(51) Int. Cl.
*F21S 8/00* (2006.01)
(52) U.S. Cl. ..................... 362/427; 362/418
(58) Field of Classification Search .......... 362/184, 362/190, 208, 191, 418, 419, 427, 428, 18, 362/431; 340/908
See application file for complete search history.

(56) References Cited

U.S. PATENT DOCUMENTS

| | | | |
|---|---|---|---|
| 2,237,536 A | 4/1941 | Wells, Jr. | |
| 3,841,594 A | 10/1974 | Zinn | |
| 5,684,452 A * | 11/1997 | Wang | 340/321 |
| 5,690,418 A | 11/1997 | Hsiung | |
| 5,853,241 A | 12/1998 | Sharrah | |
| 6,454,228 B1 | 9/2002 | Bosnakovic | |
| 6,457,841 B1 | 10/2002 | Lynch | |
| 6,873,249 B2 | 3/2005 | Chu | |
| 6,899,441 B2 | 5/2005 | Chen | |
| 7,011,423 B2 | 3/2006 | Chen | |
| 7,063,444 B2 | 6/2006 | Lee | |
| 7,224,271 B2 | 5/2007 | Wang | |
| 7,364,320 B2 | 4/2008 | Van Deursen | |
| 2001/0020903 A1 * | 9/2001 | Wang | 340/908 |
| 2002/0136005 A1 | 9/2002 | Lee | |
| 2002/0167806 A1 | 11/2002 | Thaxton | |
| 2004/0124997 A1 * | 7/2004 | Chu | 340/908 |
| 2006/0082321 A1 * | 4/2006 | Van Deursen et al. | 315/200 A |
| 2006/0225319 A1 * | 10/2006 | Jedlicka et al. | 40/310 |
| 2007/0235604 A1 | 10/2007 | Speggiorin | |
| 2009/0095855 A1 | 4/2009 | Su | |
| 2010/0039801 A1 * | 2/2010 | Pelletier et al. | 362/184 |

FOREIGN PATENT DOCUMENTS

EP 00156290 A2 * 10/1985
GB 8104743 9/1981

OTHER PUBLICATIONS

Machine English Translation of EP0156290 of Oct. 1985.*

* cited by examiner

*Primary Examiner* — Mariceli Santiago
*Assistant Examiner* — Glenn Zimmerman
(74) *Attorney, Agent, or Firm* — Michael A. Blake

(57) ABSTRACT

A flashlight comprising: a rotatable head containing a light source; a pivot in communication with the rotatable head; a center housing rotatably attached to the pivot, where the pivot and the rotatable head rotates at least in a plane that is parallel to the main axis of the center housing, the center housing having a first end that is furthest away from the head; a first leg rotatably attached to the center housing; a second leg rotatably attached to the center housing; a third leg rotatably attached to the center housing; and where all three legs each have generally the shape of a longitudinal third of a hollow cylinder; a sliding sleeve slideably attached to the center housing, and in communication with the first, second and third legs.

6 Claims, 9 Drawing Sheets

MULTI-LEG ROTATABLE HEAD FLASHLIGHT

CROSS-REFERENCES

The present application claims the benefit of provisional patent application No. 61/205,507 filed on Jan. 20, 2009 by Gary van Deursen, the entire contents of which are fully incorporated by reference herein.

FIELD OF THE INVENTION

This invention relates to handheld flashlights and particularly relates to flashlights that can be disposed in an upright, self-supporting position.

BACKGROUND

Mechanisms are known that hold flashlights in self-supporting upright positions to free an operator's hands. One known device discloses a flashlight with a support clip to hold the flashlight in an upright position. Unfortunately, since the clip is small relative to the flashlight, the clip cannot stably support the flashlight. Another flashlight discloses a flashlight with legs that expand into a tripod position to support the flashlight in and upright position. Unfortunately, the legs make the flashlight cumbersome, bulky, and quite strange looking. Another flashlight has legs that expand into a tripod position, with each of the three legs being battery source holders. This can be very confusing to consumers, as they may not know how many batteries to insert into how many of the legs. Unfortunately, to fit in the hand of an operator without being too large and bulky, the arrangement forces the batteries in the legs to be only of very small diameter "AA" type batteries or smaller. In addition, the flashlight has at least eight potential opening points exposed to dirt and water contamination. Leg construction shows each of the three legs with a removable cap on one end and pivot connection points on the other end. Two exposed pivot points connect the head and body for adjusting the head angle are exposed to dirt and water, and also create a visual discontinuity to the flashlight form. Other flashlights with tripod legs are known that pivotally connect to the body. Unfortunately the pivot points provide the only connection between the legs to the body and are a frangible link. Other known mechanisms for holding a flashlight in a self supporting upright position are bulky, complex, and render the flashlight cumbersome to operate. An additional problem with existing tripod flashlights is often there are spring loaded legs which force the legs to open completely with no means to make a smaller tripod footprint. The maximum open leg tripod footprint is often larger than the space available to stand.

Thus there is a need for a flashlight to overcome the above and other disadvantages.

SUMMARY

The disclosed invention relates to a flashlight comprising: a rotatable head containing a light source; a pivot in communication with the rotatable head; a center housing rotatably attached to the pivot, where the pivot and the rotatable head rotates at least in a plane that is parallel to the main axis of the center housing, the center housing having a first end that is furthest away from the head; a first leg rotatably attached to the center housing, the first leg having generally the shape of a longitudinal third of a hollow cylinder; a second leg rotatably attached to the center housing, the second having generally the shape of a longitudinal third of a hollow cylinder; a third leg rotatably attached to the center housing, the third leg having generally the shape of a longitudinal third of a hollow cylinder; a sliding sleeve slideably attached to the center housing, and in communication with the first, second and third legs.

The disclosed invention also relates to a flashlight comprising: a rotatable head containing a light source; a pivot in communication with the rotatable head; a center housing rotatably attached to the pivot, where the pivot and the rotatable head rotates at least in a plane that is parallel to the main axis of the center housing; a first leg rotatably attached to the center housing, the first leg having generally the shape of a longitudinal third of a hollow cylinder; a second leg rotatably attached to the center housing, the second having generally the shape of a longitudinal third of a hollow cylinder; a third leg rotatably attached to the center housing, the third leg having generally the shape of a longitudinal third of a hollow cylinder; a first sliding sleeve slideably attached to the center housing, and in communication with the first, second and third legs; a flashlight selection indicator located on the head; a tripod position indicator located on the head; a second sliding sleeve in rotatable communication with the first sliding sleeve, and in generally helical communication with the center housing; a sleeve position indicator located on the second sliding sleeve, and adjacent to the flashlight selection indicator when in a flashlight selection mode; and moving away from the flashlight selection indicator when rotating each of the first, second and third legs away from the center housing; and moving towards the flashlight selection indicator when rotating each of the first, second and third legs towards the center housing.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

FIGS. 1 through 5 illustrates a series of side elevation views of the hand-held flashlight 10 as the first leg 40, second leg 50, and third leg 60 open into the hands-free tripod 12 (leg 60 is not visible in these figures). The flashlight 10 comprises a rotatable head 20, a center housing 30, the aforementioned first, second and third legs 40, 50, 60, a first, second and third actuation arms 70, 80, 90, a sliding sleeve 100, a removable end cap 110, a rubber end cap 55 located at a second distal end of each of the first, second and third legs 40, 50, 60. Rotatable head 20 connects to center housing portion 30 with pivot 22 for rotative movement of the head 20 with respect to the housing 30. Rotatable head 20 contains a light source, such as but not limited to an incandescent bulb, and one or more LED lights. As shown in FIGS. 1-8. 1, sliding sleeve 100 has a first hinged sleeve connection 42, a second hinged sleeve connection 52, and a third hinged sleeve connection 62. Each of these hinged sleeve connections 42, 52, 62 connects the sliding sleeve 100 at generally a first distal end of each of the first, second and third legs 40, 50, 60 respectively. First leg 40 has a first hinged leg connection 44 located between the first and second distal ends of the first leg 40. The first hinged leg connection 44 is attached to a first actuation arm 70. The first actuation arm 70 is attached to a first center housing hinged connection 72. The first center housing hinged connection 72 is attached to the center housing 30. Similarly, the second leg 50 has a second hinged leg connection 54 located between the first and second distal ends of the second leg 50. The second hinged leg connection 54 is attached to a second actuation arm 80. The second actuation arm 80 is attached to a second center housing hinged connection 82. The second center housing hinged connection 82 is attached to the center housing 30. In addition, the third leg 50 has a third hinged leg connection 64 located between the first and second distal ends of the first leg 40. The third hinged leg connection 54 is attached to a third actuation arm 90. The third actuation arm 90 is attached to a third center housing hinged connection 92. The third center housing hinged connection 92 is attached to the center housing 30. When sliding sleeve 100 is moved down with respect to the legs 40, 50, 60 (see arrow 150 on FIG. 1), the legs 40, 50, 60 are urged to move down along with hinged sleeve connections 42, 52, 62. Actuation arms 70, 80, 90 are connected with hinged connections to the three legs 40, 50, 60 and to center housing 30. When the sliding sleeve 100 moves down, each of the legs 40, 50, 60 are also forced down.

Figure 1:
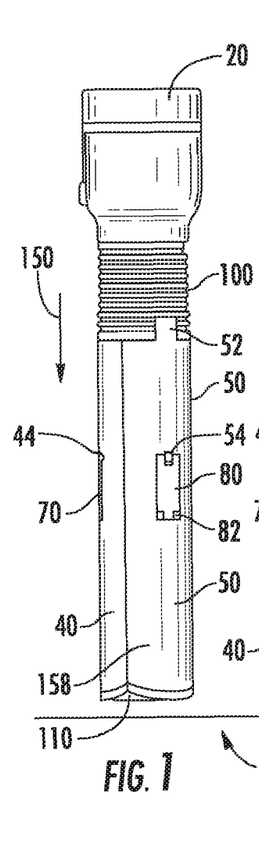
FIG. 1 is side view of the disclosed flashlight in a closed condition.
Figure 2:
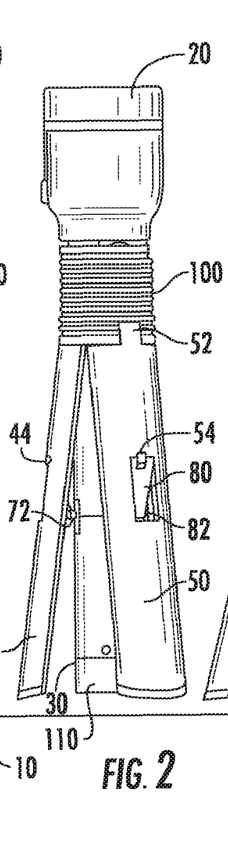
FIG. 2 is a side view of the disclosed flashlight from FIG. 1, in a slightly opened condition.
Figure 3:
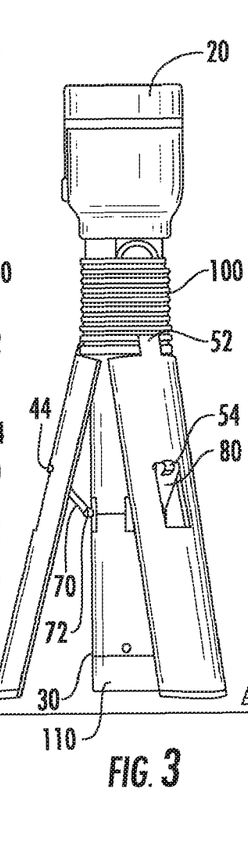
FIG. 3 is a side view of the disclosed flashlight from FIG. 2, in a more opened condition.
Figure 4:
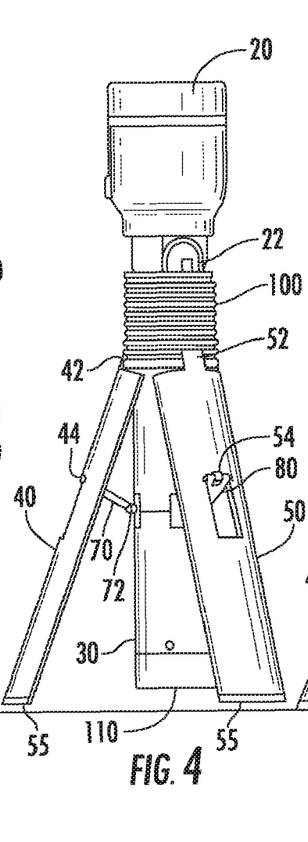
FIG. 4 is a side view of the disclosed flashlight from FIG. 3, in still a greater opened condition.
Figure 5:
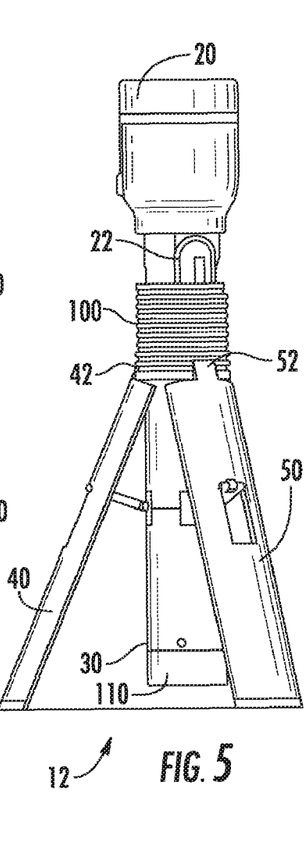
FIG. 5 is a side view of the disclosed flashlight from FIG. 4, in a fully opened condition.

Each actuation arm 70, 80, 90 is pinned to the center housing 30, thus forcing each actuation arm 70, 80, 90 to rotate out and away from the center housing 30, thus forcing the second distal end of the legs 40, 50, 60 of the tripod 12 to move out and away from the center housing 30. When the sliding sleeve 100 is moved down opening the tripod legs 40, 50, 60, the pivot 22 is exposed and becomes operable, thus allowing a user to rotate and aim the head 20 of the flashlight so that the light emanating from the flashlight 10 illuminates whatever the user chooses. In addition, as the sleeve 100 is moved down, the tripod legs 50, 60, 70, begin to move down with respect to the center housing 30, such that the bottom ends of the tripod legs (the ends away from the head) extend beyond the center housing 30, so that the bottom end of the center housing (the end away from the head), does not interfere with the ability of the three legs 50, 60, 70 to operate as a tripod, allowing the flashlight 10 to stand up. In FIG. 1, the flashlight 10 appears as a standard flashlight with a cylindrical base 162, comprised by the first, second and third legs 40, 50, 60 closed about the center housing 30. FIG. 1 shows the sleeve 100 in a first position, and FIG. 5 shows the sleeve 100 in a second position. In one embodiment, when the sleeve 100 is in the first position, the head 20 is unable to rotate with respect to the center housing 30.

Figure 6:
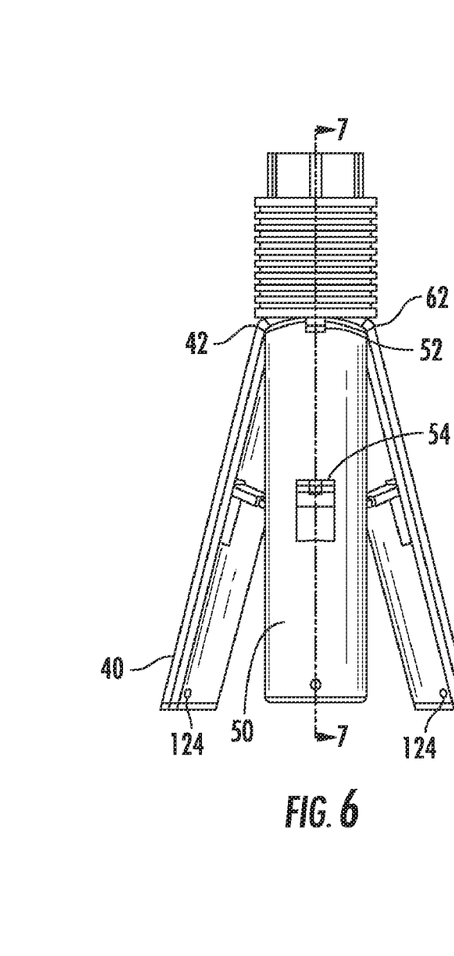
FIG. 6 is a side view of the disclosed flashlight showing details of the actuation arms, and with the head removed.
Figure 7:
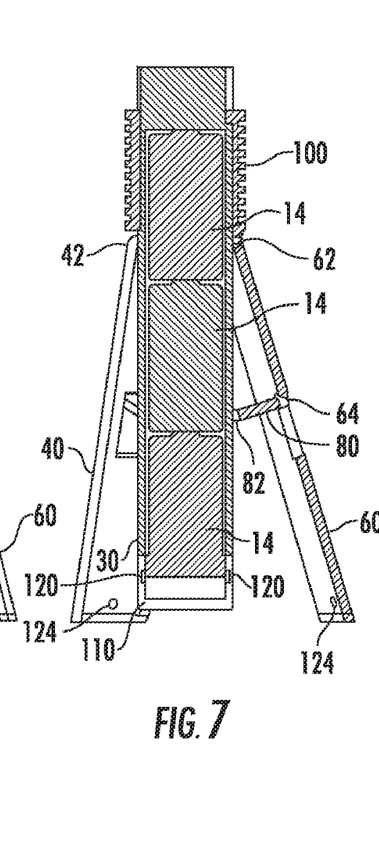
FIG. 7 is a cross-sectional view of the disclosed flashlight with the head removed.
Figure 8:
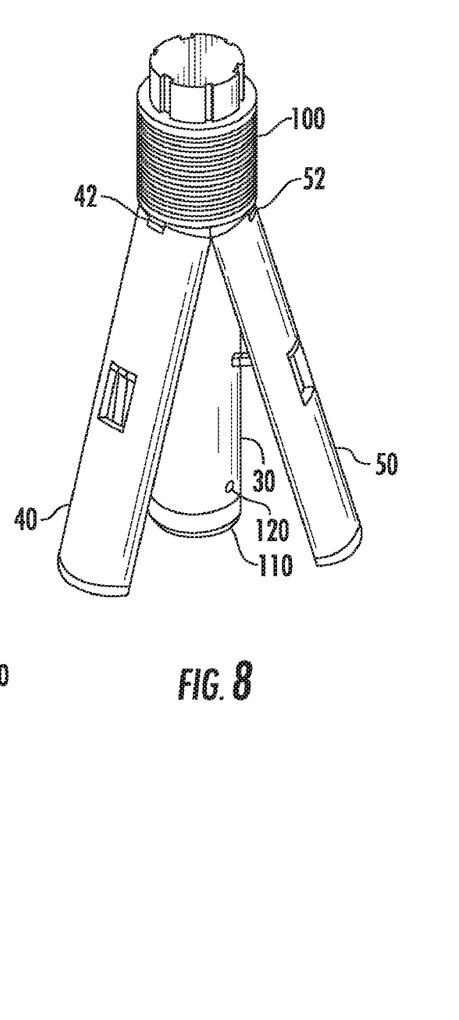
FIG. 8 is a perspective view of the disclosed flashlight from FIG. 6.
Figure 9:
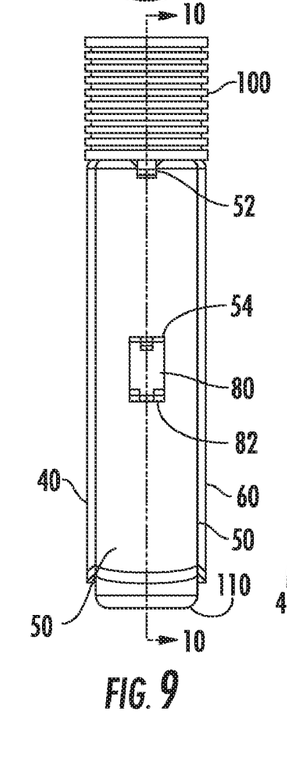
FIG. 9 is a side view of the disclosed flashlight showing details of the hinged leg connection and the housing hinged connection, with the head removed.
Figure 10:
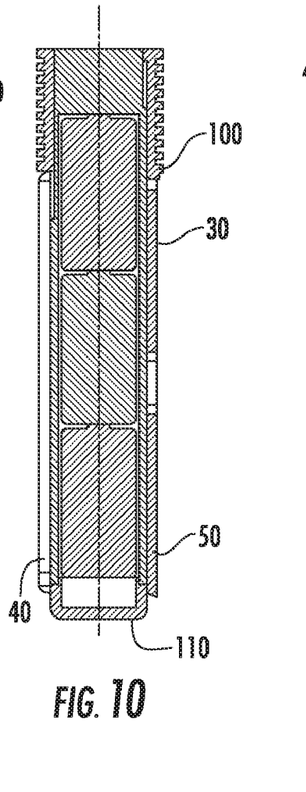
FIG. 10 is a cross-sectional view of the flashlight from FIG. 9.
Figure 11:
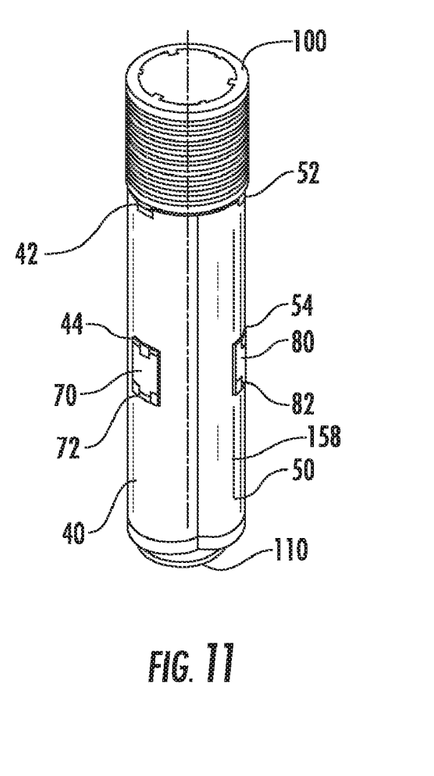
FIG. 11 is a perspective view of the flashlight from FIG. 9.
Figure 12:
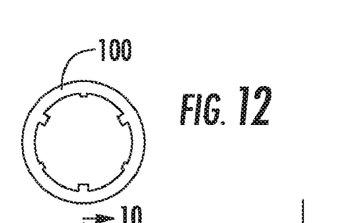
FIG. 12 is a top view of the sliding sleeve.

FIGS. 6 through 8, show the flashlight 10 with the pivot 22 and head 20 removed to better illustrate the power source 14 located within the center housing 30. In one embodiment, the power source may be one or more batteries, such as but not limited to sizes AAA, AA, C, D, 9 volt, etc. Of course, one of ordinary skill in the art will recognize that the center housing 30 may be alternately sized and shaped to accommodate any other suitable battery type or quantity. Removable end cap 110 is screwed or otherwise fastened to the end of center housing 30 to releasably secure the power source 14 within center housing 30. The flashlight 10 may also comprise magnets 120 located on the center housing and magnetic objects 124 (objects that are attracted to magnets). The magnetic objects 124 are disposed on inward sides of the legs 40, 50, 60. When the legs are in a closed flashlight position the magnets 120 and magnetic objects 124 are aligned such that the magnets 120 tends to keep the legs 40, 50, 60 closed. The magnetic connection can be broken when sleeve 100 slides down urging legs 40, 50, 60 down and away from the magnets 120. As shown in FIGS. 9 through 11, where the head 20 and pivot 22 are not shown for illustration purposes, legs 40, 50, 60 wrap around center housing 30 to form a smooth, traditional flashlight appearance when not in an open tripod position. In one embodiment, each of the legs 40, 50, 60 forms generally a longitudinal third of a hollow cylindrical shape, or in other words generally 120° of a hollow cylinder. When all three legs 40, 50, 60 are closed, they form a hollow cylinder that fits closely against the center housing 30. See FIG. 11, which shows the three legs 40, 50, 60 closed about the center housing 30, and thus forming a cylindrical base 162 that looks similar standard flashlight bases. FIG. 12 is a top view of the sliding sleeve 100.

Figure 13:
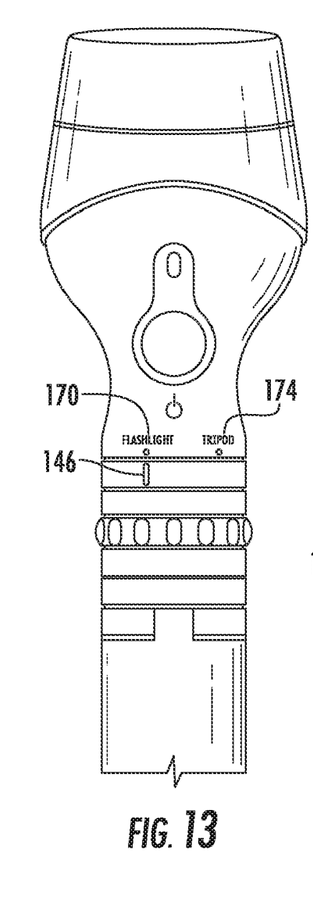
FIG. 13 is a side view of an alternative embodiment of the disclosed flashlight, with a cam member.
Figure 14:
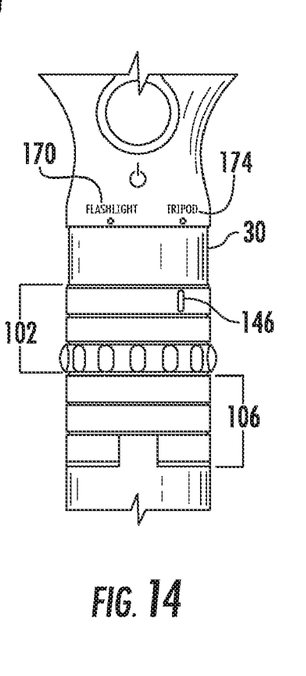
FIG. 14 is a side view of the flashlight from FIG. 13, with the switched toggled to the tripod position.
Figure 15:
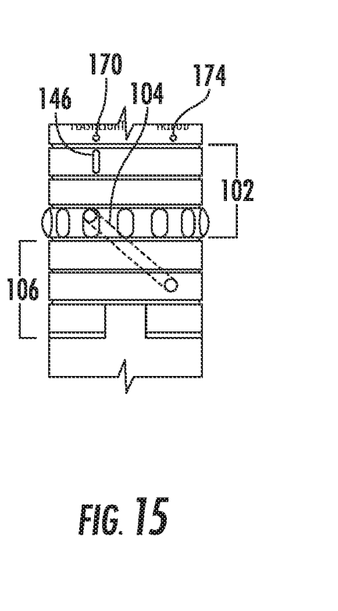
FIG. 15 is a detail view of the sliding sleeve from the flashlight of FIG. 13.
Figure 16:
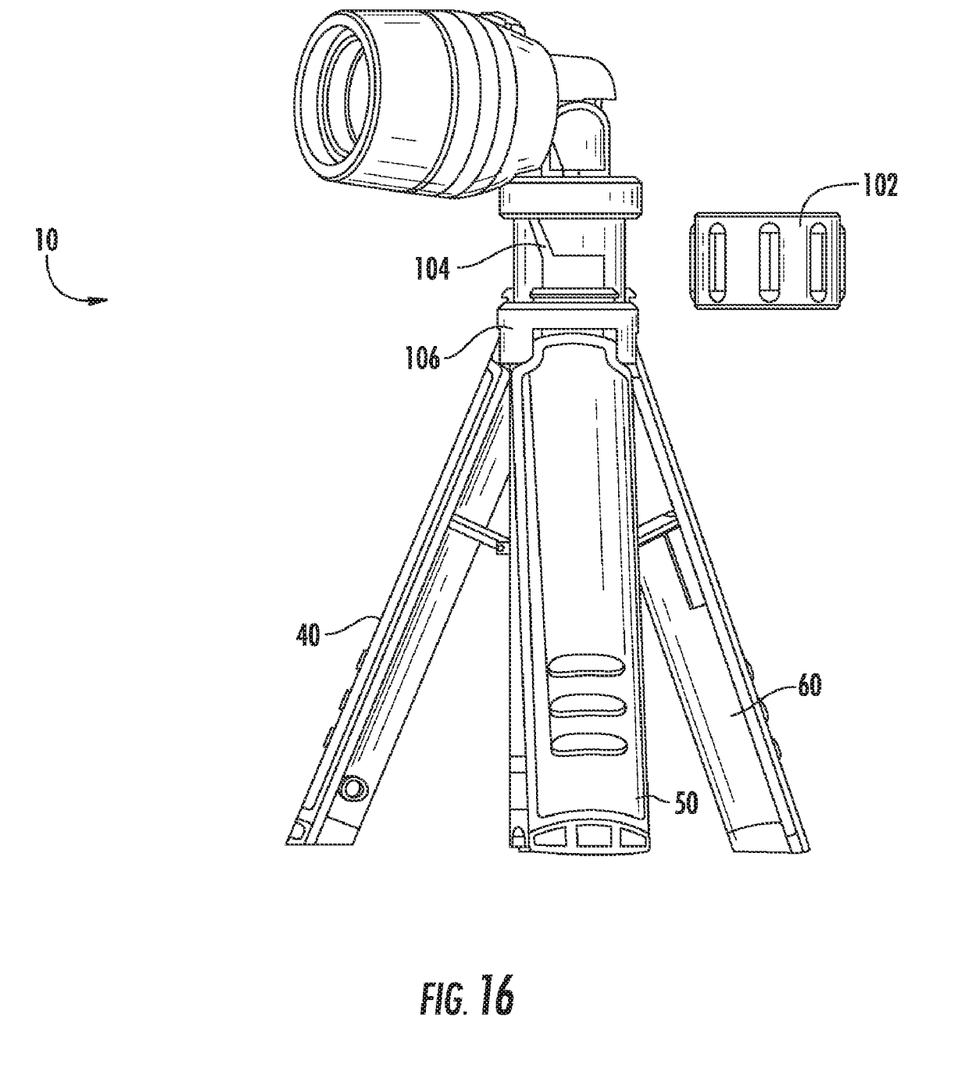
FIG. 16 is a perspective view of the flashlight in a tripod orientation, with the rotating sleeve 102 removed.

FIGS. 13 through 15 illustrate an alternative method of moving the sliding sleeve up and down to move the legs. Under rotating sleeve section 102 a channel 104 is formed in center housing 30. The channel 104 interacts with a protrusion from rotating sleeve 102. Rotating the sleeve 102 moves it up or down following the channel 104. Below sleeve section 102 is sliding sleeve section 106 which only slides up and down and is rotationally connected to sleeve section 102. Sleeve 106 translates the twisting cam action into a straight up and down motion to move the legs 40, 50, 60. The channel 104 comprises a generally helical path about the center housing 30. In addition, in this embodiment there is a sleeve position indicator 146 located on the rotating sleeve section 102 that can be moved from a "flashlight" selection indicator 170 to a "tripod" selection indicator 174. When the sleeve position indicator 146 is moved from the "flashlight" selection indicator 170, to the "tripod" selection indicator 174, the sleeve 102 rotates and moves down following the channel 104, causing the sleeve 106 to move down, thereby opening the tripod legs 40, 50, 60. FIG. 16, shows a perspective view of the flashlight 10, with the sleeve 102 removed so that the channel 104 is clearly visible. The channel 104 forces the sleeve 102 in a downward and right direction as the sleeve 102 is twisted to the right (as shown in FIG. 16). Also, sleeve 106 moves only in a downward direction when the sleeve 102 is twisted or turned to the right. When the sleeve 102 is twisted to the left, the sleeve 102 moves upward and to the left. Also, the sleeve 106 only moves in an upward direction, when the sleeve 102 is twisted or turned to the left.

Figures 17, 18:
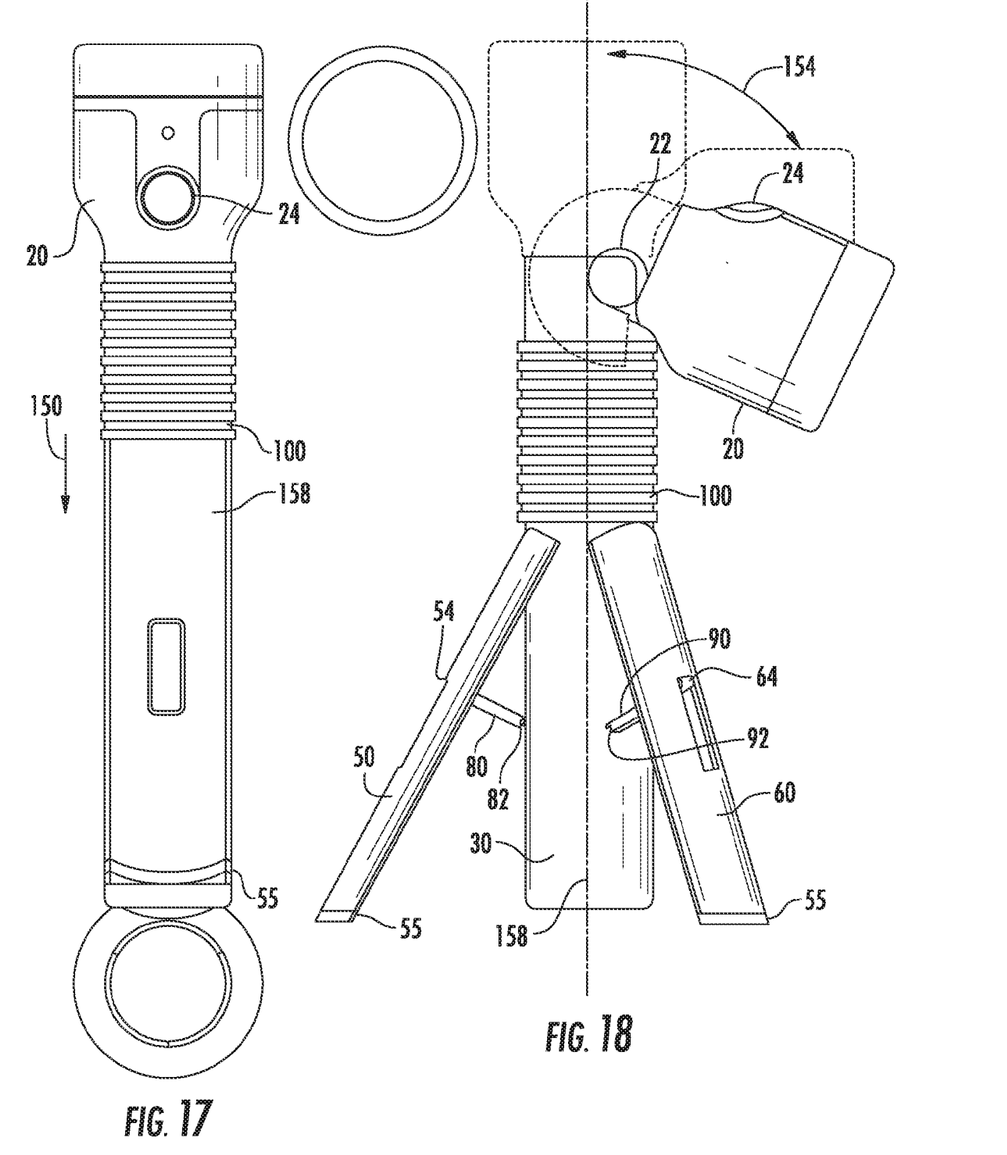
FIG. 17 is an enlarged side view of the disclosed flashlight.
FIG. 18 is an enlarged side view of the disclosed flashlight in an open condition with the head rotated approximately 110°.

FIG. 17 shows the flashlight in a standard flashlight mode, and FIG. 18 shows the flashlight in a tripod mode. When sliding sleeve 100 moves down, in the direction of the arrow 150, pivot 22 is exposed, allowing the user to rotate the head 20 about the pivot 22 with respect to the center housing 30. Switch 24 turns the light source on and off with a push action or alternately with a sliding action. The tripod legs have rubber like end caps 55. The head 20 can rotate at least in a plane defined by curved arrow 154. The plane defined by curved arrow 154 is generally parallel to the main axis 158 of the center housing.

Figure 19:
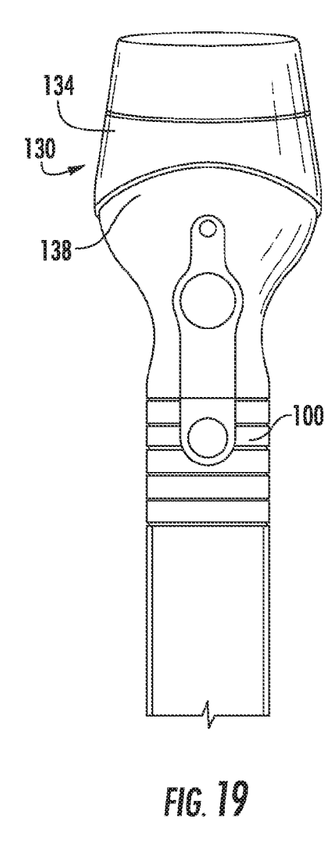
FIG. 19 is a front view of a ball and socket embodiment of the disclosed invention.
Figure 20:
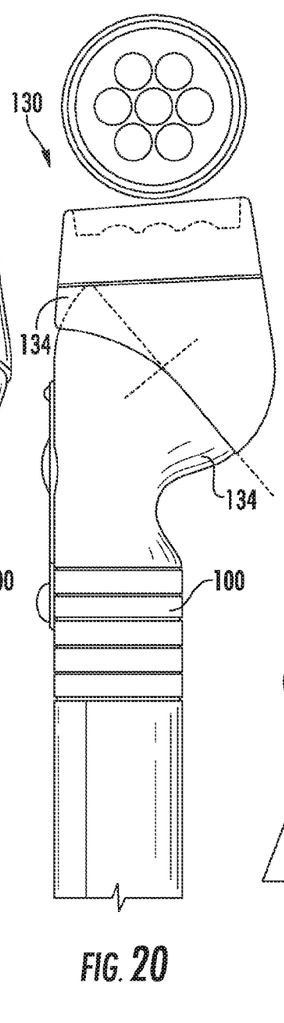
FIG. 20 is a side view of the flashlight from FIG. 18.
Figure 21:
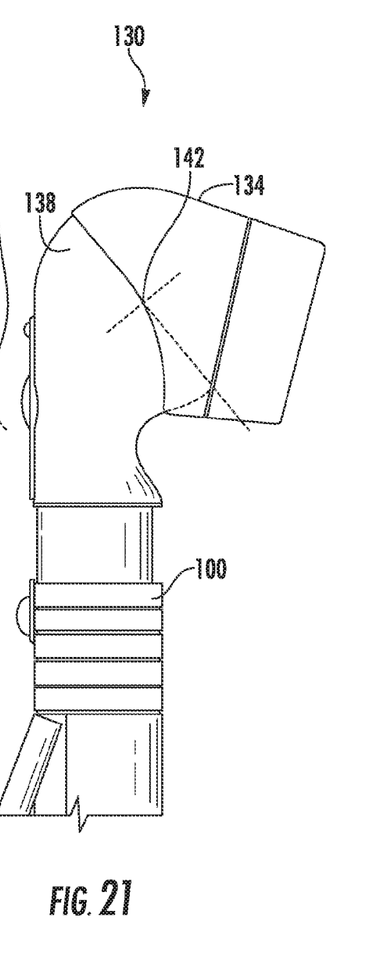
FIG. 21 is a side view of the disclosed flashlight with the head rotated about 100°.

FIGS. 19 through 21 illustrate an alternate spherical configuration for the flashlight 130. Head 134 is slideably attached to a generally spherical body 138, and is configured to generally receive the generally spherical body 138 into a generally concave shaped surface on the head 134. This is much like a ball and socket arrangement. The head 134 and body 138 rotate relative to each other about a pivot point 142. Pivot point 142 is located generally in the interior of the spherical body 138 and is protected due to its location within the spherical body 138. The head 134 contains the light source for the flashlight 130. The user can slide the head 134 relative to the spherical body 138, rotating the head 134 about pivot 142 to position and aim the light source. Head 134 and spherical body 138 have a frictional interface with each other. The frictional interface may also include detents to maintain the selected position.

Figure 22:
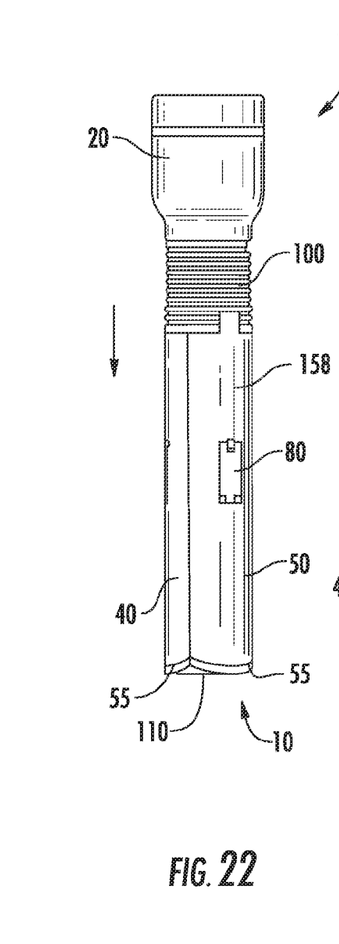
FIG. 22 is a side view of the disclosed flashlight.
Figure 23:
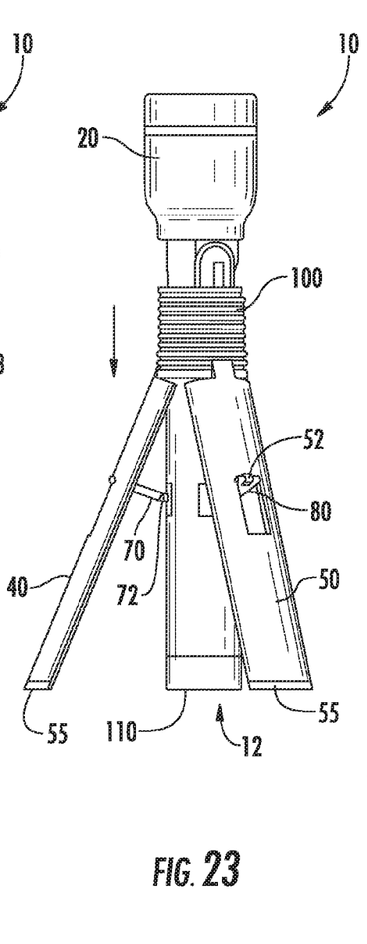
FIG. 23 is a side view of the disclosed flashlight in an opened position.
Figure 24:
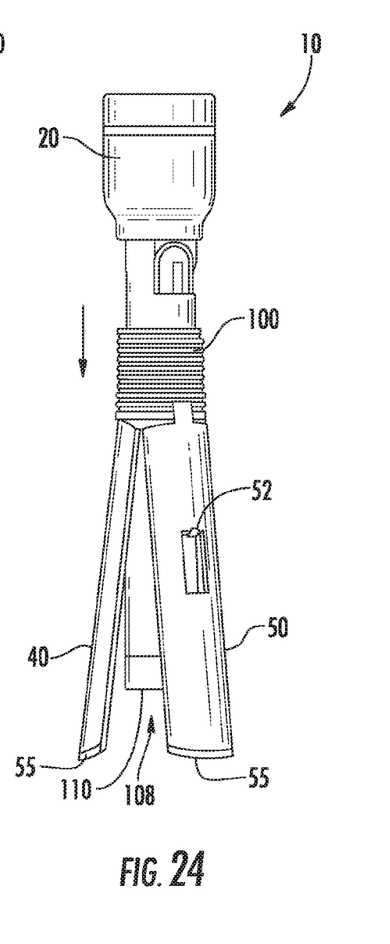
FIG. 24 is a side view of the disclosed flashlight beyond a fully opened position.

Shown in FIGS. 22 through 24, each of the legs 40, 50, 60 can, in one embodiment, be urged by sliding sleeve 100 down to move beyond the full open tripod position 12. This causes the actuation arms 60, 70, 80 to force legs 40, 50, 60 down even lower with respect to the center housing 30. The bottom of legs 40, 50, 60 form a receiving area 108, which can be used to place or wedge the legs 40, 50, 60 on an object such as, but not limited to, a pipe, tree limb, two by four, etc., providing additional hands free positions. The legs 40, 50, 60 may have grips or grabbing like devices located at or near the leg end caps 55. FIG. 24 shows the sleeve 100 in one of a plurality of positions beyond the first and second positions.

Figure 25:
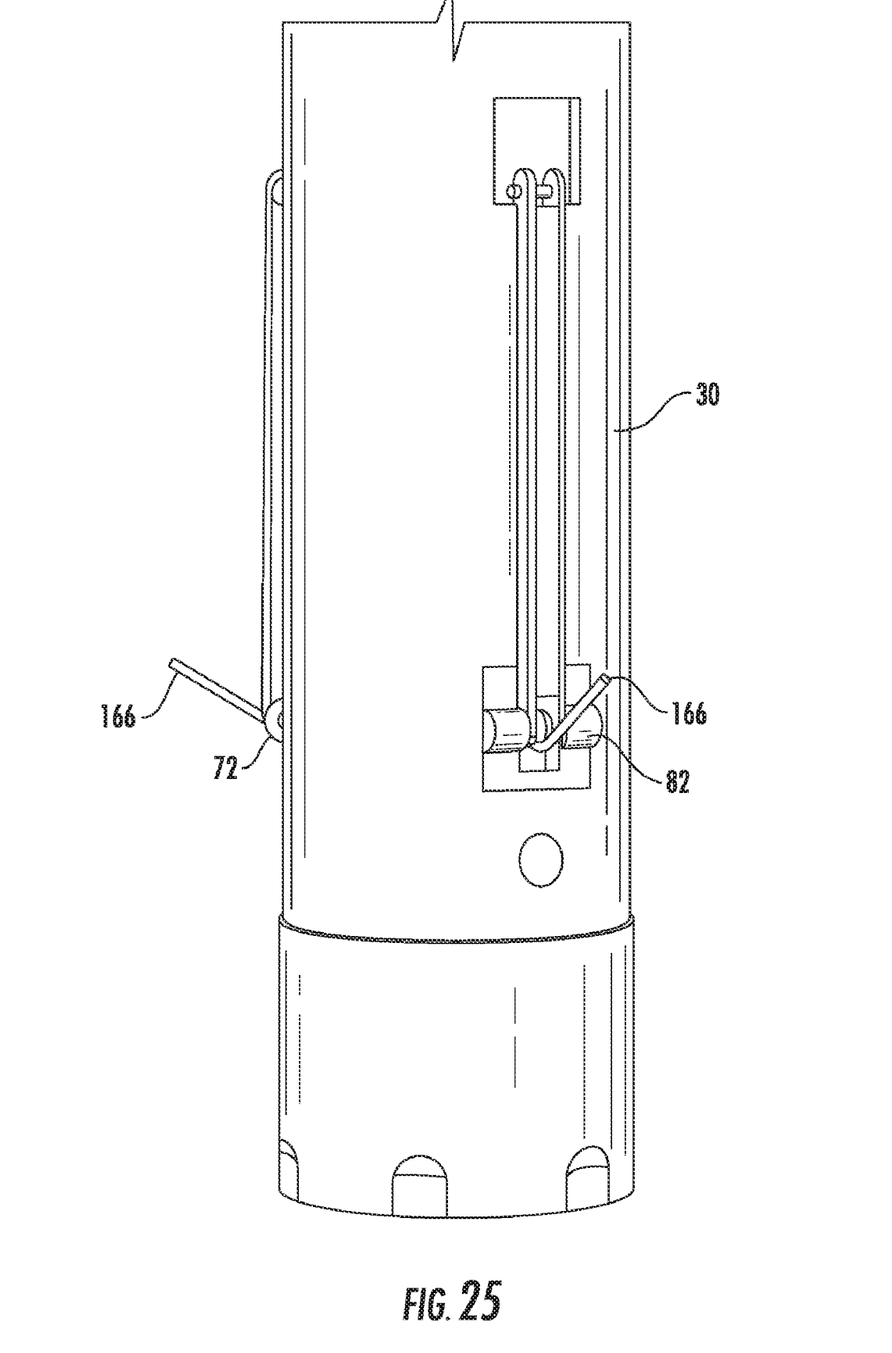
FIG. 25 is a close up view of the center housing, and springs.

FIG. 25 is a close up view of the center housing portion 30. In this view, an embodiment of the flashlight 10 is shown, where each of the actuation arms 70, 80, 90 may be spring loaded with a spring 166 located on each housing hinged connection 72, 82, 92. The actuation arms 70, 80, 90 in this view in order to allow viewing of the springs 166. The springs 166 are configured to tend to push each of the actuation arms 70, 80, 90 away from the center housing portion.

Accordingly, one or more of the embodiments of this invention provides a compact handheld flashlight with legs that expand into stable tripod positions to support the flashlight's head in an elevated position. After the operator appropriately expands the legs and positions the flashlight head, the operator's hands are free.

Another aspect of one or more embodiments of the present invention provides a flashlight that includes a head with a light source, center housing with space for one or more batteries, surrounded by first, second and third legs connected to the housing. At least two of the legs are pivotally movable between open and closed positions.

According to a further aspect of one or more of these embodiments, the first, second and third legs are generally parallel to each other when at least two of the legs are in the closed position.

According to a further aspect of one or more of the embodiments, the first, second, and third legs together with the center housing form a longitudinally elongated flashlight handle when the at least two of the legs are in the closed position. The flashlight handle forms a longitudinal axis. The head defines an illumination direction that is generally parallel to the longitudinal axis of the flashlight housing.

In one or more of the embodiments, the flashlight dimensions can be scaled appropriately for the users hand and provide for use of one ore more AAA, AA, C, D or rechargeable batteries. The center housing provides the battery compartment. In one embodiment, the center housing is tubular. The tubular center housing may be surrounded by three covers wrapping around and conforming to the center housing, forming the three tripod legs. Each leg is attached by a hinge at the top edge to a sliding sleeve. Each leg is also attached by a pivot in a lower location to one end of an actuation arm. That actuation arm is in turn attached on the opposite end of the actuation arm by a pivot to the center housing tube. When the flashlight is in the closed tripod position the three legs and actuation arms lay flush surrounding the center housing. To open the flashlight to the tripod position the sliding sleeve is moved down, pushing the top of the three pivotally attached legs down. The three actuation arms pivotally attached to the legs and housing body simultaneously force the bottoms of the legs outward. The extent that the sleeve is moved down determines the opening size of the tripod base triangle formed by the legs. One embodiment of this design would allow the sleeve to continue to push the legs down beyond the full open tripod position, to the point that the actuation arms force the bottoms of the legs to form a receiving area to be located on to a tool such as a pipe, tree limb, etc., providing additional hands free use.

The tubular center housing, containing the batteries, in other embodiments could be triangular or other hollow shapes. One end of the center housing has a removable cover to close and retain the batteries in the compartment. The other end of the center housing is attached to the flashlight head. The head contains the lighting element(s) which could be one or more incandescent bulbs, one or more LEDS, or other light sources. The head also contains an electrical push or slide switch that controls the flow of electricity to the one or more light sources. In other embodiments the switch could be located in the housing body.

Another aspect of one or more of the embodiments has the motion of the sliding sleeve moved up or down by a rotational motion of a section of the sleeve interacting with a cam on the lower center housing surface.

When the sliding sleeve is moved down to extend the tripod legs, a pivot connection between the head and center housing is exposed. The head can then be rotated at the pivot connection, allowing the light to be positioned at work angles other than parallel with the handle. The pivot connection has a frictional surface area, such as a series of detents in the pivot, to provide controlled positioning of the head. When the sliding sleeve is moved up into the flashlight position, it covers and provides additional protection for the pivot action from dirt and water, and visually hides the rotation means, looking more like a traditional flashlight.

In an alternate to one or more of the embodiments, the head shape is generally spherical, with a rotational connection to the center housing being located at an angle intersecting through the center of the sphere. The top half of the sphere has the light source(s) and the lower half of the sphere is part of the center housing. When the two halves are rotated the light source direction is moved in relation to the center line of the housing. The intersecting angle of the two halves of the sphere is such that the light source can be moved beyond ninety degrees in relation to the center line of the housing, such that the light can point down toward the tripod resting surface.

According to further aspects of one or more of the embodiments the exterior of each of the tripod legs have additional covering material that visually hides the actuation arms.

The disclosed invention has many advantages. One is that the footprint of the tripod legs can vary in size, allowing the tripod to stand on larger, or smaller areas, and items. Another advantage is that there is a single removable end cap, which can be removed to allow one to change or insert batteries (or other power sources) into the center housing. When the sliding sleeve is in an up position, the flashlight appears like a standard flashlight, that is, the legs of the flashlight close about the center housing, and gives the flashlight a standard cylindrical look about the body of the flashlight. All three legs are opened and closed with one simultaneous motion of the sleeve controlling the three legs.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A flashlight comprising:
a rotatable head containing a light source;
a pivot in communication with the rotatable head;
a center housing rotatable attached to the pivot, wherein the pivot and the rotatable head rotates at least in a plane that is parallel to the main axis of the center housing, the center housing having a first end that is furthest away from the head;
a first leg rotatably attached to the center housing, the first leg having generally the shape of a longitudinal third of a hollow cylinder;
a second leg rotatably attached to the center housing, the second having generally the shape of a longitudinal third of a hollow cylinder;
a third leg rotatably attached to the center housing, the third leg having generally the shape of a longitudinal third of a hollow cylinder;
a sliding sleeve slideably attached to the center housing, and in communication with the first second and third legs;
a flashlight selection indicator located on the head;
a tripod position indicator located on the head;
a sleeve position indicator located on the sliding sleeve, and adjacent to the flashlight selection indicator when in a flashlight selection mode; and moving away from the flashlight selection indicator when rotating each of the first, second and third legs away from the center housing; and moving towards the flashlight selection indicator when rotating each of the first, second and third legs towards the center housing.

2. A flashlight comprising:
a rotatable head containing a light source;
a pivot in communication with the rotatable head;
a center housing rotatably attached to the pivot, wherein the pivot and the rotatable head rotates at least in a plane that is parallel to the main axis of the center housing;
a first leg rotatably attached to the center housing, the first leg having generally the shape of a longitudinal third of a hollow cylinder;
a second leg rotatably attached to the center housing, the second having generally the shape of a longitudinal third of a hollow cylinder;
a third leg rotatably attached to the center housing, the third leg having generally the shape of a longitudinal third of a hollow cylinder;
a first sliding sleeve slideably attached to the center housing, and in communication with the first, second and third legs;
a flashlight selection indicator located on the head;
a tripod position indicator located on the head;
a second sliding sleeve in rotatable communication with the first sliding sleeve, and in generally helical communication with the center housing;
a sleeve position indicator located on the second sliding sleeve, and adjacent to the flashlight selection indicator when in a flashlight selection mode; and moving away from the flashlight selection indicator when rotating each of the first, second and third legs away from the center housing; and moving towards the flashlight selection indicator when rotating each of the first, second and third legs towards the center housing.

3. The flashlight of claim 2, further comprising:
a helical channel located in the center housing near the head;
a protrusion extending from the interior surface of the second sliding sleeve, and in communication with the helical channel.

4. The flashlight of claim 2, further comprising:
a first position, where the first and second sliding sleeves are at a top most position, closest to the rotatable head, and with the first, second, and third legs forming generally a cylinder enclosing the center housing; and
a second position, where the first and second sliding sleeves are slid away from the head along the center housing, such that the first, second and third legs are fully rotated away from the center housing and extend past the first end of the center housing.

5. The flashlight of claim 4, further comprising:
a plurality of positions beyond the first position and second position, where the first and second sliding sleeves are slid past the second position away from the head, and the first, second, and third legs begin to rotate back towards the center housing, but are extended past the first end of the center housing.

6. The flashlight of claim 5, wherein when the flashlight is in any one of the plurality of positions, the first, second and third legs each exert a force directed generally towards the interior of each of the three legs respectively.

* * * * *